United States Patent
Shin

(10) Patent No.: US 12,374,753 B2
(45) Date of Patent: Jul. 29, 2025

(54) FIRE EXTINGUISHING SYSTEM FOR BATTERY OF VEHICLE

(71) Applicants: Hyundai Motor Company, Seoul (KR); Kia Corporation, Seoul (KR)

(72) Inventor: Hyeon Gi Shin, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 537 days.

(21) Appl. No.: 17/971,104

(22) Filed: Oct. 21, 2022

(65) Prior Publication Data
US 2023/0163409 A1 May 25, 2023

(30) Foreign Application Priority Data
Nov. 23, 2021 (KR) .................... 10-2021-0161827

(51) Int. Cl.
| | |
|---|---|
| *H01M 50/383* | (2021.01) |
| *A62C 3/16* | (2006.01) |
| *A62C 37/40* | (2006.01) |
| *H01M 10/48* | (2006.01) |
| *H01M 50/24* | (2021.01) |
| *H01M 50/317* | (2021.01) |

(52) U.S. Cl.
CPC ............ *H01M 50/383* (2021.01); *A62C 3/16* (2013.01); *A62C 37/40* (2013.01); *H01M 10/482* (2013.01); *H01M 50/24* (2021.01); *H01M 50/317* (2021.01); *H01M 2200/10* (2013.01); *H01M 2220/20* (2013.01)

(58) Field of Classification Search
CPC .. H01M 50/383; H01M 50/24; H01M 50/317; H01M 10/48
See application file for complete search history.

(56) References Cited

U.S. PATENT DOCUMENTS

| | | | | |
|---|---|---|---|---|
| 2001/0055712 | A1* | 12/2001 | Cittanova | H01M 10/42 429/61 |
| 2014/0186668 | A1* | 7/2014 | Jung | H01M 10/613 429/61 |
| 2020/0078623 | A1* | 3/2020 | Ling | A62C 3/16 |

FOREIGN PATENT DOCUMENTS

KR 10-2014-0064176 A1 * 5/2014 ............ H01M 10/42

OTHER PUBLICATIONS

Machine Translation of: Seong et al. (KR 10-2014-0064176), May 28, 2014.*

* cited by examiner

*Primary Examiner* — Kenneth J Douyette
(74) *Attorney, Agent, or Firm* — Morgan, Lewis & Bockius LLP

(57) ABSTRACT

A fire extinguishing system includes a gas discharger provided at a battery pack and configured to discharge gas in the battery pack, a gas channel configured so that the gas produced from the battery pack and discharged through the gas discharger flows through the gas channel when a fire occurs, an extinguishing agent tank in which an extinguishing agent is kept, a heat exchange channel provided in the extinguishing agent tank, connected to the gas channel so that the gas supplied through the gas channel flows through the heat exchange channel, and facilitating heat exchange between the gas flowing through the heat exchange channel and the extinguishing agent kept in the extinguishing agent tank, and a nozzle provided at the battery pack, connected to the extinguishing agent tank through an extinguishing agent supply channel, and supplying the extinguishing agent, which is supplied from the extinguishing agent tank, into the battery pack.

20 Claims, 10 Drawing Sheets

FIRE EXTINGUISHING SYSTEM FOR BATTERY OF VEHICLE

CROSS REFERENCE TO RELATED APPLICATION

The present application claims priority to Korean Patent Application No. 10-2021-0161827, filed Nov. 23, 2021, the entire contents of which is incorporated herein for all purposes by this reference.

BACKGROUND OF THE PRESENT DISCLOSURE

Field of the Present Disclosure

The present disclosure relates to a fire extinguishing system for a battery of a vehicle, and more particularly, to a fire extinguishing system for a battery of a vehicle, the fire extinguishing system being able to rapidly and accurately detect a fire generated in a battery pack and to effectively suppress the fire immediately after detecting.

Description of Related Art

Recently, as the interest in energy efficiency and problems with environment contamination and exhaustion of fossil fuels is increased, eco-friendly vehicles that can substantially replace the vehicle with an internal combustion engine have been developed.

As eco-friendly vehicles, a Battery Electric Vehicle (BEV) using a battery as a power source, a Fuel Cell Electric Vehicle (FCEV) using a fuel battery as a main power source, a Hybrid Electric Vehicle (HEV) using both an engine and a motor as a power source for driving a vehicle, etc. may be exemplified.

Such eco-friendly vehicles (xEVs) all have something in common in that they are all driven by driving a motor using power accumulated in a battery. Such an electric vehicle is mounted with a high-voltage pack that supplies power to a motor and the high-voltage battery pack supplies power to the electric parts in the vehicle such as the motor while being repeatedly charged and discharged while the vehicle is driven.

The battery pack of electric vehicles generally includes a battery case, a battery module disposed in the battery case, and a Battery Management System (BMS) that collects information such as the voltage, current, and temperature of cells forming the battery module and is configured to control operation of the cells. Furthermore, the battery pack includes a configuration that prevents a fire by cutting a fuse or disconnecting a relay connected to an inverter when a short circuit is generated or an overcurrent flows in the battery pack.

A fire may occur in the battery pack in an electric vehicle due to various reasons such a collision and malfunction of parts while the electric vehicle is driven. If a fire of the battery pack is not suppressed well, the fire may cause total destruction of the vehicle, which may result in a large loss of objects and lives. Recently, as electric vehicles are increasingly used, the danger of a fire in a battery or surrounding high-voltage electrical wires due to external shock or an internal short circuit has increased.

A fire of a battery may rapidly spread due to structures and sub stances inside and outside the battery and public transportation vehicles such as a bus carry many passengers, so it is necessary to rapidly cope with a fire for the safety of passengers, and when the first response fails, it may result in a catastrophe.

Nevertheless, a method of preparing and using a fire extinguisher at the best is used at present as a method that can cope with a fire of a vehicle. Even in the instant case, when a driver does not use a fire extinguisher at a proper time, early extinguishing fails and the fire may spread throughout a vehicle. Furthermore, a fire occurs at a battery, it is difficult to completely extinguish the fire by only using a small fire extinguisher or spraying an extinguishing agent due to the substances in the battery.

Furthermore, because a driver is in a vehicle while driving, it is difficult to recognize a fire before a lot of smoke is generated even if a fire occurs at a battery. Furthermore, because buses have a large and long body unlike passenger cars, it is more difficult to recognize whether a fire has occurred.

Furthermore, in accordance with the types of vehicles including a large-size bus, there is an external protective structure such as case covering the battery cells of a battery mounted on the roof, etc. Accordingly, even if a driver recognizes a fire at a proper time, it is difficult to spray an extinguishing agent into the battery case, and even if a driver sprays an extinguishing agent, the extinguishing agent does not reach well the battery cells in the battery case, so effective extinguishing is impossible.

Generally, because a large-size bus, etc. are provided with a plurality of battery packs and each of the battery packs is provided with an expensive fire sensor to determine battery packs with a fire, there is a problem that the manufacturing cost considerably increases. Furthermore, even if an expensive gas sensor (gas concentration measurement sensor) that detects gas concentration is provided as a fire sensor at each battery pack, there is a possibility of mis-detecting.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fire extinguishing system for a battery of a vehicle, the fire extinguishing system being able to rapidly and accurately detect a fire generated in a battery of a vehicle and to effectively suppress the fire immediately after detecting.

The objectives of the present disclosure are not limited to those described above and other objectives not stated herein would be apparently understood by those who have ordinary skills in the art that the present disclosure belongs to (hereafter, 'those skilled in the art') from the following description.

To achieve the objectives, an exemplary embodiment of the present disclosure provides a fire extinguishing system that includes: a gas discharger provided at a battery pack and configured to discharge gas in the battery pack; a gas channel configured so that the gas produced from the battery pack and discharged through the gas discharger flows through the gas channel when a fire occurs; an extinguishing agent tank in which an extinguishing agent is kept; a heat exchange channel provided in the extinguishing agent tank, connected to the gas channel so that the gas supplied through the gas channel flows through the heat exchange channel, and facilitating heat exchange between the gas flowing through the heat exchange channel and the extinguishing agent kept in the extinguishing agent tank; and a nozzle provided at the battery pack, connected to the extinguishing agent tank through an extinguishing agent supply channel, and supplying the extinguishing agent, which is supplied from the extinguishing agent tank, into the battery pack, in which the extinguishing agent kept in the extinguishing agent tank is supplied through the extinguishing agent supply channel by internal pressure of the extinguishing agent tank increased during the heat exchange.

Therefore, according to the fire extinguishing system for a battery of a vehicle of the present disclosure, it is possible to rapidly and accurately detect a fire that occurs at a battery in a vehicle and can effectively suppress the fire immediately after detecting.

According to an exemplary embodiment of the present disclosure, it is possible to supply an extinguishing agent in an extinguishing agent tank to a battery pack without a separate pressurizing unit such as a pump or a compressor by use of flammable gas, which is discharged from a battery pack when a fire occurs, as a thermal medium. Accordingly, it is possible to reduce the installation cost of the system and to suppress a fire even in a situation in which power cannot be supplied to drive a pump or a compressor.

Furthermore, it is possible to suppress a following fire using carbon dioxide, which was converted by the catalyst converter from carbon monoxide in flammable gas produced from a battery pack, as an extinguishing agent in re-ignition after a primary fire.

Furthermore, when one assistant fire sensor simply and inexpensively configured is provided for each battery pack and one main fire sensor (gas concentration measurement sensor) which is configured to measure a gas concentration is provided in the gas channel to which the battery packs are connected in the present disclosure, it is possible to detect a battery fire and recognize all battery packs with a fire using only the one expensive main fire sensor for the plurality of battery packs.

Because an inexpensive assistant fire sensor is used to recognize a battery pack with a fire and only one expensive main fire sensor is used to finally determine a battery pack with a fire, mis-detecting of a fire may be prevented and the manufacturing cost may be considerably reduced as compared with when an expensive gas concentration measurement sensor is provided for each battery pack, as in the related art.

Furthermore, because the fire extinguishing system of the present disclosure performs the function of a pressure balancing element, it is possible to balance the pressure inside and outside the battery pack without installing several pressure balancing elements on the battery pack.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
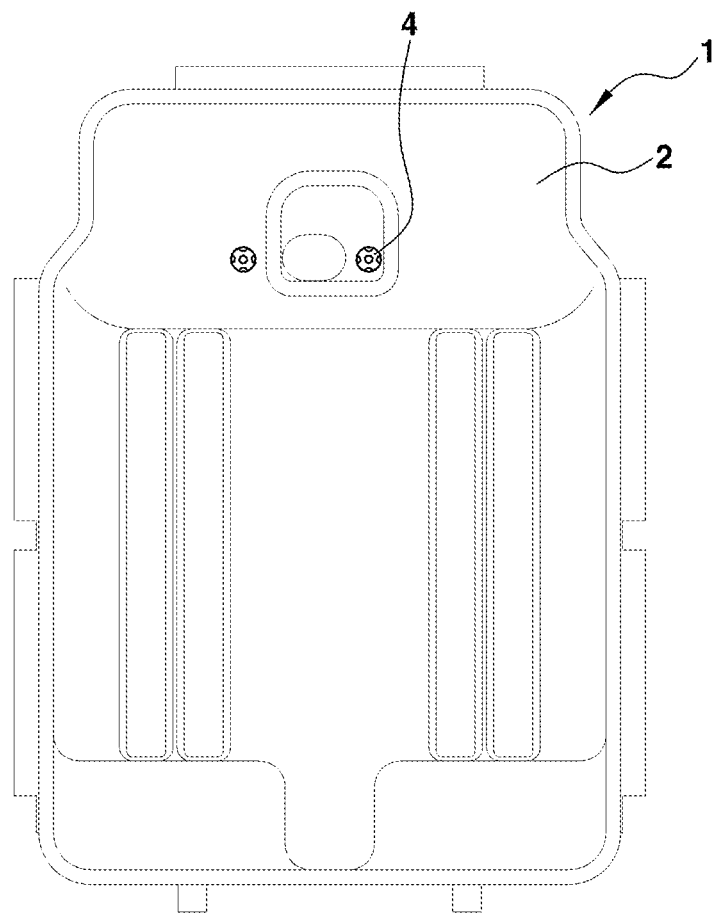
FIG. 1 is a view showing an example when a well-known pressure balancing element is provided on a battery case.
Figure 2:
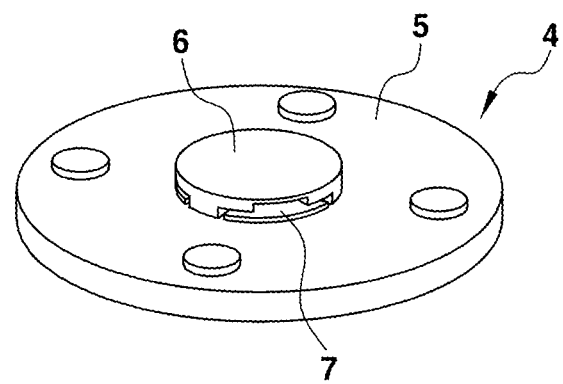
FIG. 2 is a perspective view of the well-known pressure balancing element known in the art.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Description of specific structures and functions included in embodiments of the present disclosure are only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

Embodiments of the present disclosure will be described hereafter in detail with reference to the accompanying drawings.

The present disclosure was designed to provide a fire extinguishing system for a battery of a vehicle, the fire extinguishing system being able to rapidly and accurately detect a fire generated in a battery pack and to effectively suppress the fire immediately after detecting.

If it is possible to detect early a fire of a battery pack in a vehicle, it is possible to enable a driver and passengers to rapidly and safely escape out of the vehicle by giving a warning within a short time period when a fire occurs.

To the present end, the fire extinguishing system according to an exemplary embodiment of the present disclosure is configured to be able to early detect a fire generated at a battery pack, and give a warning and automatically suppress the fire immediately after detecting.

As for a common fire generation mechanism of the battery in electric vehicles, an overvoltage is generated in a battery or external shock is applied to the battery, the membrane may be decomposed and an electrolyte may be pyrolyzed when the membrane is damaged.

In the instant case, high-temperature flammable gas is produced from battery cells and it is possible to know that the main component of the flammable gas is carbon monoxide (CO) from battery fire tests. The point in time when flammable gas is emitted is the point in time when early extinguishing is possible.

Thereafter, when gas expands in the battery and the gas and electrolyte leak out of the battery cells, thermal runway is generated, which may result in explosion of the battery. It is almost impossible to suppress the fire from the present point in time. Accordingly, it is required to rapidly detect emission of flammable gas and suppress a fire in an early stage by spraying an extinguishing agent to the battery pack with a fire at the point in time of emission of the flammable gas.

According to an exemplary embodiment of the present disclosure, a fire is detected using gas which is emitted from a battery cell in an early stage, that is, a flammable gas emission stage in which a fire of the battery cell may be suppressed. That is, a fire is recognized and determined in an early stage by detecting gas which is emitted by pyrolysis of an electrolyte in a battery cell, etc.

In the instant case, a pressure balancing element which is provided at a battery pack is used to detect gas. The battery packs that are mounted in vehicles are necessarily provided with such a pressure balancing element.

A common automotive battery pack includes a battery case and a battery module disposed in the battery case, and the battery module includes a plurality of unit batteries, that is, battery cells. The battery cells forming the battery module of a battery pack are sealed in the battery case.

According to an exemplary embodiment of the present disclosure, the internal temperature of the battery case repeats increasing and decreasing, depending on the charging/discharging states of the battery cells. There should be a passage through which gas can flow inside and outside when the internal temperature repeats increasing and decreasing.

The pressures inside and outside the battery case can keep balanced only when a gas passage is in the battery case, so it is possible to prevent the battery pack from expanding or contracting. For the present purpose, the battery case of a battery pack is provided with a pressure balancing element that provides a passage for gas to flow between the inside and the outside.

FIG. 1 is a view showing an example when a well-known pressure balancing element is provided on a battery case. As shown in the figure, a pressure balancing element 4 through which gas flows in and out of a battery case at normal times is provided at a battery case 2 of a battery pack 1. The pressure balancing element 4 has a passage for gas to flow in and out of the battery case 2.

A battery module is accommodated in the battery case 2 shown in FIG. 1, and battery cells of the battery module are sealed by the battery case. In the present battery pack, the internal temperature of the battery case 2 repeats increasing and decreasing, in accordance with the charging/discharging states of the battery cells.

To prevent the battery case 2 from expanding or contracting, as shown in the figure, a plurality of pressure balancing elements 4 is provided at the battery case so that gas flows in and out of the battery case through the gas passages of the balancing elements at normal times (when a fire does not occur). Accordingly, it is possible to prevent expansion and contraction of the battery case 2 and pressure can keep balanced inside and outside the battery case.

FIG. 1 is a perspective view showing a well-known pressure balancing element as a reference view for helping understand the present disclosure. As shown in the figure, the well-known pressure balancing element 4 includes a plate 5 which is configured to be fixed in close contact with the external surface of a battery case (indicated by '2' in FIG. 1), and a vent portion integrally disposed at the center portion of the plate 5.

In the well-known pressure balancing element 4, a plurality of vents 7 through which gas can pass is formed at the vent portion 6 positioned at the center portion as a plurality of passages for gas to flow in and out of the battery case.

Accordingly, pressures inside and outside the battery case may be balanced while gas passes through the vents 7 of the vent portion 6 with the plate 5 fixed to the external surface of the battery case.

In the well-known pressure balancing element 4, the vents (gas passages 7) are formed in a small size at the vent portion 6 to prevent external moisture from flowing into the battery case.

One vent 7 is not enough for pressure adjustment (pressure balancing), so a plurality of small vents is formed at the pressure balancing element 4, and a plurality of pressure balancing elements is provided at each battery pack.

In the present disclosure, new types of pressure balancing element and ventilation valve that perform not only the pressure adjustment (pressure balancing) function in a battery pack at normal times, but a function of discharging gas, which is produced from battery cells, only to a passage (a gas passage to be described below) in which a main fire sensor is positioned rather than to the outside in a fire are used.

Figure 3:
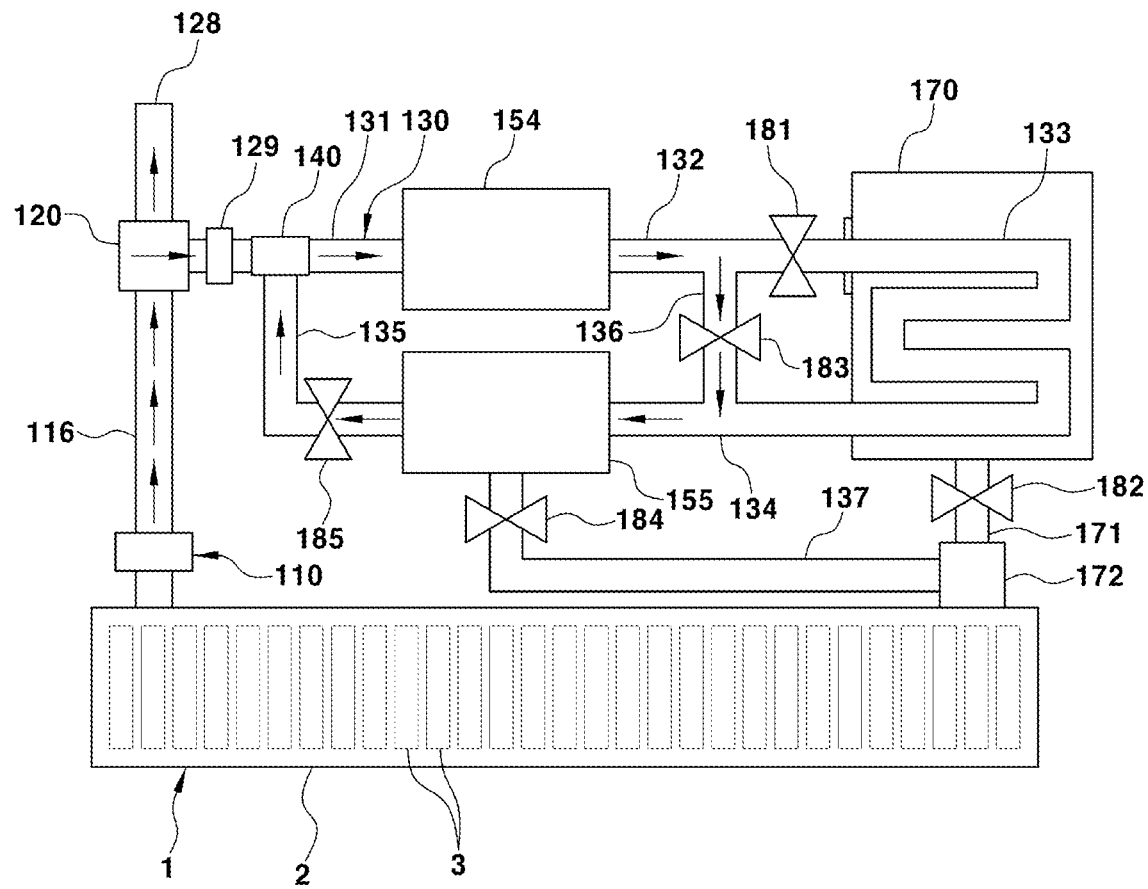
FIG. 3 is a view showing the entire configuration of a fire extinguishing system according to an exemplary embodiment of the present disclosure.
Figure 4:
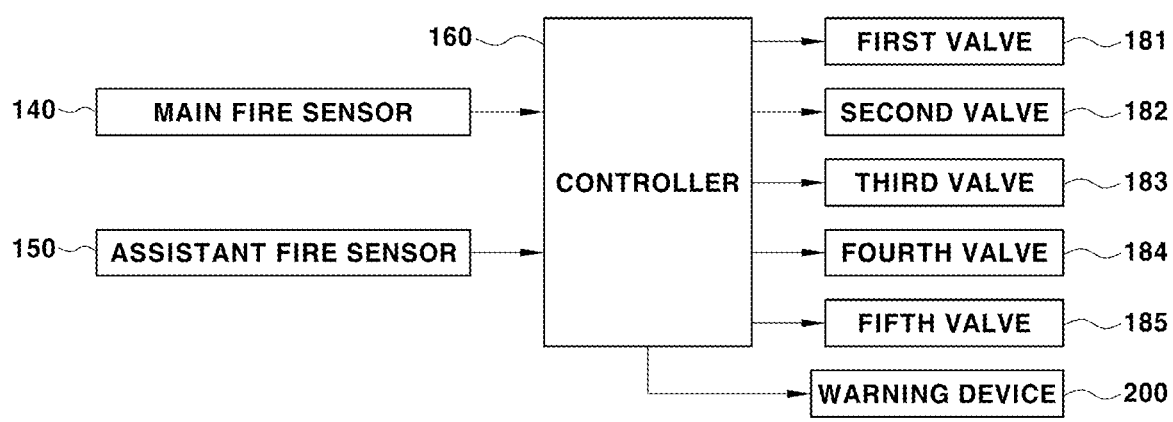
FIG. 4 is a block diagram showing detecting elements, a control element, and operating elements of the fire extinguishing system according to an exemplary embodiment of the present disclosure.

FIG. 3 is a view showing the entire configuration of a fire extinguishing system according to an exemplary embodiment of the present disclosure. A fire extinguishing system that automatically detects a fire of a battery pack 1 in an early stage and suppresses the fire immediately after detecting is exemplarily shown in FIG. 3. FIG. 4 is a block diagram showing detecting elements, a control element, and operating elements of the fire extinguishing system according to an exemplary embodiment of the present disclosure.

As for the detailed configuration, the fire extinguishing system according to an exemplary embodiment of the present disclosure includes a gas discharger provided at a battery pack and configured to be able to discharge gas in the battery case 2.

The gas discharger in an exemplary embodiment of the present disclosure may be a pressure balancing element 110 which is provided at the battery case 2 and provides a passage for gas to flow in and out of the battery case.

Figure 5:
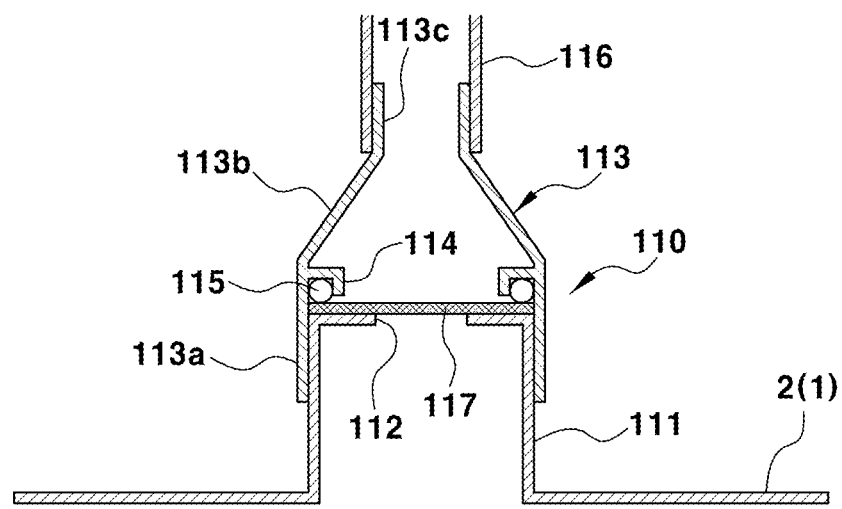
FIG. 5 is a cross-sectional view showing a pressure balancing element provided at a battery case of a battery pack in an exemplary embodiment of the present disclosure.

FIG. 5 is a cross-sectional view showing a pressure balancing element provided at a battery case of a battery pack in an exemplary embodiment of the present disclosure. As shown in the figure, the pressure balancing element 110 includes: a vent portion 111 disposed on the battery case 1 of the battery pack 1 and including a vent 112 through which air can pass and which is formed between the inside and outside of the battery case; a connector 113 coupled to the vent portion so that the internal space thereof communicates with the vent 112 of the vent portion 111; and a venting channel 116 provided in a structure extending a predetermined length from the connector 113 and including an internal passage that communicates with the internal space of the connector 113, the vent 112, and the internal space of the vent portion 111.

As described above, the vents of the vent portion that are formed as gas passages in the well-known pressure balancing element have very small size and channel cross-sectional area to prevent inflow of moisture. However, in the pressure balancing element 110 of the present disclosure, the vent 112 of the vent portion 111 has relatively large size and channel cross-section, and the connector 113 and the venting channel 116 that extend predetermined length from the vent 112 are provided. Accordingly, there is almost no possibility that moisture flows into the battery case 2 through the venting channel 116 including a predetermined length as long as sealing is maintained well only at the joints of the components.

In an exemplary embodiment of the present disclosure, a ventilation-waterproof film member 117 that passes gas but blocks external moisture may be provided at the vent 112 of the vent portion 111. The ventilation-waterproof film member 117, as shown in FIG. 5, is provided in a structure that blocks the vent 112 of the vent portion 111.

In an exemplary embodiment of the present disclosure, as the ventilation-waterproof film member 117, a fluorine resin film that can block moisture and pass gas, in detail, a film member made of expanded polytetrafluoroethylene (ePTFE) known as the brand name, Gore-Tex®, may be used.

In the instant case, a ventilation-waterproof film member 117 that can discharge moisture in the battery case 2 and can prevent moisture outside the battery case from flowing inside through the vent 112 of the vent portion 111 may be used.

The vent portion 111 may be formed in a plate shape protruding outwardly from the surface of the battery case 2 and the vent 112 including a predetermined diameter or size may be formed at the protruding end portion of the vent portion 111. In an exemplary embodiment of the present disclosure, the vent portion 111 may be formed toward the outside on the surface of the battery case 2 in a pipe shape having a circular cross-section, that is, a circular pipe shape.

The connector 113 has a configuration in which a large-diameter portion 113a being relatively large in diameter is formed to an end portion and a small-diameter portion 113c being relatively small in diameter is formed at another rend portion, and a tapered portion 113b of which the diameter gradually decrease is formed between the large-diameter portion 113 a and the small-diameter portion 113 a.

The large-diameter portion 113a may be thread-fastened to the external surface of the vent portion 111, and to the present end, threads may be formed on the internal surface of the large-diameter portion 113a and the external surface of the vent portion 111. The small-diameter portion 113c is coupled to the venting channel 116, and the internal surface of the small-diameter portion 113c fitted on the external surface of the venting channel 116 or the external surface of the small-diameter portion 113c may be fitted on the internal surface of the venting channel 116.

The surfaces of the small-diameter portion 113c and the venting channel 116 may be coupled and fixed by thermal bonding. As the venting channel 116, a pipe-shaped member such as a hose or a tube may be used and a member made of a material which may be thermally bonded to the connector 113 may be used.

A sealing protrusion 114 may protrude inwardly from the internal surface of the connector 113, and the connector 113 and the vent portion 111 are thread-fastened so that the sealing protrusion 114 presses the ventilation-waterproof film member 117 to the vent portion 111 with the sealing member 115 inserted therein. The sealing member 115 is provided for airtightness (sealing) between the connector 113, the vent portion 111, and the ventilation-waterproof film member 117, and may be an O-ring made of an elastic material such as rubber.

The ventilation-waterproof film member 117 is provided to be accommodated on the external surface of a protruding end portion of the vent portion 111, and is pressed to the vent portion 111 by the sealing member 115 when the large-diameter portion 113a of the connector 113 is thread-fastened to the external surface of the vent portion 111. The edge portion of the ventilation-waterproof film member 117 is pressed by the sealing protrusion 114 and the sealing member 115, so that the ventilation-waterproof film member 117 may be fixed to the external surface of the protruding end portion of the vent portion 111.

In an exemplary embodiment of the present disclosure, the sealing protrusion 114 may be formed to have an L-shaped cross-section having an open side on the internal surface of the large-diameter portion 113a of the connector 113. Accordingly, when the large-diameter portion 113 a of the connector 113 is thread-fastened to the vent portion 111 with the circular sealing member 115 inserted in the sealing protrusion 114 having an L-shaped cross-section, the sealing member 115 can press the ventilation-waterproof film member 117 through the opening of the sealing protrusion 114.

The size of the vent 112 which is a gas passage through which gas passes may be relatively freely designed in the present disclosure, and the vent 112 may be made greater than the vent 112 of the well-known pressure balancing element 110, so there is an advantage that it is possible to decrease the number of pressure balancing element to 1 for each battery pack.

Meanwhile, as shown in FIG. 3, the fire extinguishing system according to an exemplary embodiment of the present disclosure may further include a ventilation valve 120 provided at the outlet of the venting channel (indicated by '116' in FIG. 5) of the pressure balancing element 110 provided at the battery pack 1, and a gas channel 130 extending from the ventilation valve 120.

The fire extinguishing system according to an exemplary embodiment of the present disclosure may further include: a main fire sensor 140 provided in the gas channel 130; a catalyst converter 154 provided in the gas channel 130 and converting and discharging flammable gas discharged through the gas channel from the battery pack 1; an extinguishing agent tank 170 keeping an extinguishing agent for suppressing a fire at the battery pack 1; a controller 160 outputting a control signal to supply the extinguishing agent to a battery pack 1 with fire when the main fire sensor 140 detecting a fire; and valves controlled to open or close in response to the control signal output from the controller 160 so that the extinguishing agent kept in the extinguishing agent tank 170 may be supplied to the battery pack.

The controller 160 may be a Battery Management System (BMS). A check valve 129 that prevents gas, which has passed through the ventilation valve, from flowing backward to the main fire sensor 140 and the catalyst converter 154 may be provided between the ventilation valve 120 and the main fire sensor 140 in the gas channel 130.

Figure 6:
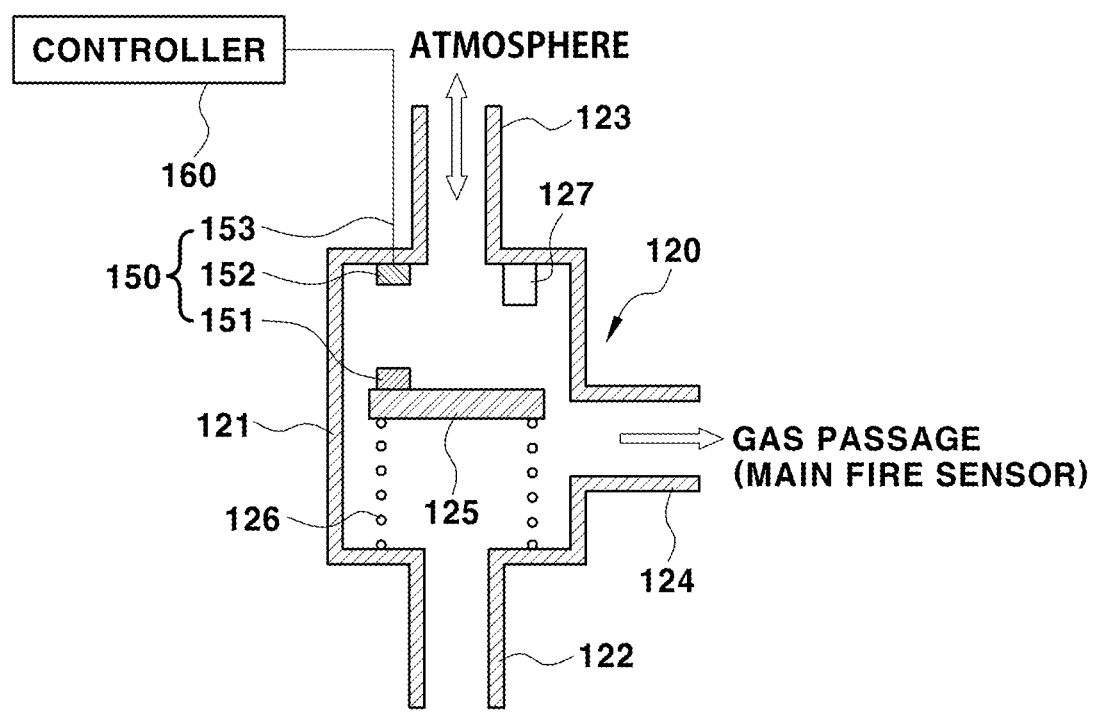
FIG. 6 and FIG. 7 are cross-sectional views showing the configuration of a ventilation valve of the fire extinguishing system according to an exemplary embodiment of the present disclosure.
Figure 7:
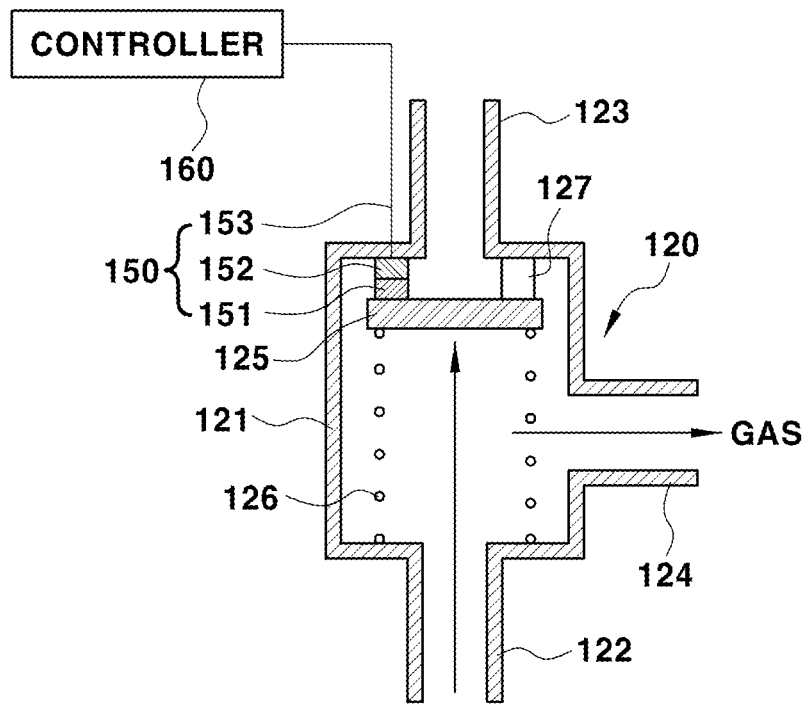

FIG. 6 and FIG. 7 are cross-sectional views showing the configuration of a ventilation valve of the fire extinguishing system according to an exemplary embodiment of the present disclosure. FIG. 6 shows the state at normal times and FIG. 7 shows the state when a fire occurs.

As shown in the figures, the ventilation valve 120 may include: a ventilation port 122 connected to the venting channel 116 of the pressure balancing element 110; an atmosphere port 123 connected to the atmosphere side; a valve housing 121 including a connection port 124 to which the gas channel 130 is connected; a valve body 125 provided in the internal space of the valve housing 121 and being moved to close the atmosphere port 123 by gas discharged from the battery pack 1 when a fire occurs; and a spring 126 provided to support the valve body 125 in the internal space of the valve housing 121.

The internal space of the valve housing 121 communicates with the internal space of the venting channel 116. Accordingly, the internal space of the valve housing 121 communicates with the internal space of the venting channel 116 and the internal space of the connector 113 of the pressure balancing element 110, and also communicates with the internal space of the vent portion 111 and the internal space of the battery case 2 with the ventilation-waterproof film member 117 therebetween.

The atmosphere port 123 of the ventilation valve 120 may be formed at the upper end portion of the valve housing 121 and an inlet-output channel (indicated by '128' in FIG. 3) through which air flows inside and outside between the atmosphere port 123 and the atmosphere may be connected to the atmosphere port 123.

The connection port 124 of the ventilation port 120 may be formed on the side of the valve housing 121. The valve body 125 of the ventilation valve 120 is positioned to open the atmosphere port 123 at normal times and to always open the connection port 124.

The spring 126 is provided under the valve body 125 and maintains the position of the valve body 125 so that the valve body 125 keeps open the atmosphere port 123 and the connection port 124 at the position. The spring 126 maintains the position of the valve body 125 so that the valve body 25 keeps the connection port 124 open not only when a fire occurs but at normal times.

As may be seen from FIG. 6 and FIG. 7, the valve body 125 has the shape of the plate 5 and is transversely provided in the internal space of the valve housing 12, and the spring 126 under the valve body 125 is disposed between the valve housing 121 and the valve body 125 to support the valve body 125 thereon.

As described above, the connection port 124 is a port which is always open regardless of whether a fire occurs, whether gas is discharged from the battery pack 1, and the position of the valve body 125. Referring to FIG. 6, it may be seen that the valve body 125 supported by the spring 126 is positioned higher than the connection port 124 at normal times. Accordingly, the connection port 124 is a port which is open always rather than being closed by the valve body 125.

On the other hand, the atmosphere port 123 is a port which is opened or closed by the valve body 125, that is, the valve body 125 opens the atmosphere port 123 at normal times, but the atmosphere port 123 is closed by the valve body 125 when a fire occurs.

When a fire occurs, gas produced from the battery pack 1 passes through the pressure balancing element 110 and then flows into the valve housing 121 of the ventilation valve 120 through the ventilation port 122. The gas flowing inside pushes up the valve body 125 and the valve body 125 is moved toward the atmosphere port 123 against the force of the spring 126, closing the atmosphere port 123. The connection port 124 keeps open regardless of the position of the valve body 125 even a fire occurs.

Accordingly, when the atmosphere port 123 is open, the internal spaces of the atmosphere port 123 and the valve housing 121, the internal spaces of the venting channel 116 and the connector 113 of the pressure balancing element 110, and the internal space of the vent portion 111 formed with the ventilation-waterproof film member 117 therebetween are used as gas passages for pressure balancing inside and outside the battery case 2.

At normal times, as shown in FIG. 6, gas flows in and out of the battery pack 1 through the pressure balancing element 110 and the ventilation valve 120 with the atmosphere port 123 open, and pressure is balanced inside and outside the battery pack 1.

In a fire, as shown in FIG. 7, because the atmosphere port 123 is closed by the valve body 125, gas produced from the battery pack 1 is not discharged to the atmosphere. The gas produced from the battery pack 1 may be discharged only through the connection port 124 which is always open, and the gas discharged through the connection port 124 flows to the main fire sensor 140 through the gas channel 130.

Accordingly, the gas is detected by the main gas sensor 140 and the controller 160 can determine that a fire has occurred based on a signal from the main fire sensor 140. The gas is the gas produced from the battery pack 1 in the early stage of a fire, in detail, flammable gas produced from the battery cells 3 accommodated in the battery case 2. The main component of the flammable gas is carbon monoxide (CO).

The ventilation valve 120 may be provided with an assistant fire sensor 150 in an exemplary embodiment of the present disclosure. The assistant fire sensor 150 is provided to detect a fire that occurs in the battery pack 1 independently from the main fire sensor 140.

The assistant fire sensor 150, as shown in FIG. 6 and FIG. 7, may include: a first magnet resistor 151 provided on the valve body 125; a second magnet resistor 152 provided and fixed at a position close to the atmosphere port 123 on the internal surface of the valve housing 121 so that the first magnet resistor 151 may be attached when the valve body 125 moves to the position for closing the atmosphere port 123; and a wire 153 connecting the first magnet resistor 151 and the controller 160 to each other so that elasticity may be transmitted.

The controller 160, though not shown, may have a current applier that applies a current to the wire 153 connected between the first magnet resistor 151 and the controller 160, and a current detector that detects a current value which is applied to the wire 153. Accordingly, a current including a predetermined value may be applied through the wire 153 from the current applier of the controller 160, and simultaneously, the value of a current flowing through the wire 153 may be detected by the current detector.

Referring to FIG. 6 and FIG. 7, it may be seen that the first magnet resistor 151 is attached to a side of the valve body 125 and the second magnet resistor 152 is attached to the internal surface of the valve housing 121 at a side facing the first magnet resistor 151. In the present structure, a shock-absorbing member 127 may be provided on another side of the valve housing 125 or at another side on the internal surface of the valve housing 121.

The shock-absorbing member 127 may be made of a material having elasticity and shock-absorbing ability such as rubber. As shown in FIG. 7, when a fire occurs and the valve body 125 is moved up by the force of gas in the figure and closes the atmosphere port 123, the shock-absorbing member 127 prevents direct contact between the valve body 125 and the valve housing 121 and absorbs shock between the valve body 125 and the valve housing 121.

Figure 8:
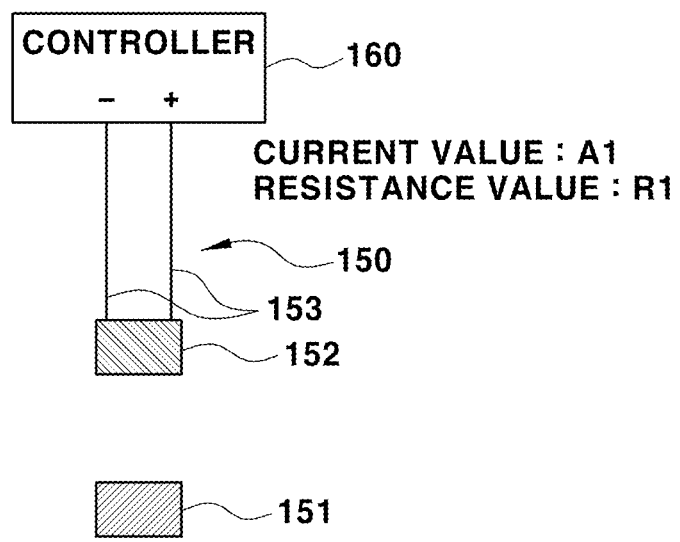
FIG. 8 and FIG. 9 are views showing an operation state of an assistant fire sensor disposed at the ventilation valve in an exemplary embodiment of the present disclosure.
Figure 9:
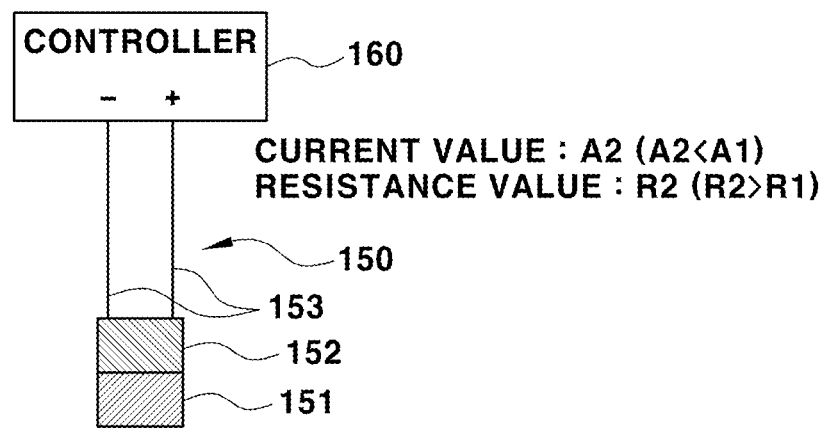

FIG. 8 and FIG. 9 are views showing an operation state of the assistant fire sensor provided at the ventilation valve 120 in an exemplary embodiment of the present disclosure, in which FIG. 8 shows the state at normal times (when a fire does not occur) and FIG. 9 shows the state when a fire occurs.

At normal times, as shown in FIG. 8, when a current is applied through the wire 153 from the controller 160, electricity is transmitted to only the wire 153 and the second magnet resistor 152 of the valve housing 121. However, when a fire occurs, the first magnet resistor 151 is attached to the second magnet resistor 152 by magnetism, as shown in FIG. 9, when the valve body 125 is moved by gas produced from the battery pack 1 and closes the atmosphere port 123.

When the first magnet resistor 151 and the second magnet resistor 152 are brought in contact with and attached to each other, a resistance value in the elasticity path is increased by the combination of the first magnet resistor 151 and the second magnet resistor 152, so that the value (i.e., intensity) of the current flowing through the wire 153 changes.

That is, the value (a reference current value) A1 of a current that flows through a path formed by only the wire 153 and the first magnet resistor 151 with the first magnet resistor 151 and the second magnet resistor 152 separated would be relatively high. Furthermore, when the first magnet resistor 151 and the second magnet resistor 152 come in contact with each other, the entire resistance value increases and the value (the actual current value) A2 of a current that flows through the wire 153, first magnet resistor 151, and the second magnet resistor 152 would be lower than that when the two magnet resistors are separate from each other.

Accordingly, the controller 160 is set to read out the value of a current flowing through the wire 153 (a signal value from the assistant fire sensor), and to determine that a fire has occurred when the value of a current is a predetermined value or less than the predetermined value. The controller 160 can determine that a fire has occurred when the detected value of a current decreases to a set value or less.

Alternately, the controller 160 may be set to determine that a fire has occurred when a variation of a current value is a predetermined amount or more. As described above, the controller 160 can read out the value of a current flowing through the wire 153 of the assistant fire sensor 150 and primarily determine whether a fire has occurred at the battery pack 1 based on the variation of the current value.

Although only one battery pack 1 is shown in FIG. 3, a fire extinguishing system may be configured for a plurality of battery packs mounted in a vehicle. That is, the pressure balancing element 110, the ventilation valve 120, and the inlet-outlet channel 128 may be provided for each of battery packs 1.

In the instant case, the gas channels connected to the connection ports 124 of the ventilation valves 120 are combined as a single gas channel 130 and the combined single gas channel 130 is connected to the inlet of the catalyst converter 154. The single gas channel connected to the inlet of the catalyst converter 154 is a first channel 131 to be described below.

The check valve 129 is provided in each of the gas channels connected to the connection ports 124 of the ventilation valves 120 and the main fire sensor 140 is provided in the combined signal gas channel 130.

An extinguishing agent supply channel 171 is connected between the extinguishing agent tank 170 and a nozzle 172 provided at each of the battery pack 1. A second valve 182 to be described below is provided in the extinguishing agent supply channel 171 connected between the extinguishing agent tank 170 and the nozzle 172 of each of the battery packs 1.

The nozzles 172 of the battery packs 1 are connected to a buffer tank 155 to be described below through an assistant supply channel 137, and a fourth valve 184 to be described below may be provided in the assistant supply channel 137.

In the fire extinguishing system configured for a plurality of battery packs 1 in the present way, an assistant fire sensor 150 which is a primary fire sensor provided in the ventilation valve 120 is also provided at each of the battery packs 1 together with the pressure balancing element 110 and the ventilation valve 120.

As a result, the controller 160 can determine battery packs with a fire based on signals from the assistant fire sensors 150 provided for the battery packs 1, respectively. That is, when a current value which is a signal value from the assistant fire sensor 140 is a predetermined value or less than the predetermined value or a variation of the current value is a predetermined amount or less at a battery pack of all of the battery packs 1, the battery pack may be determined as a battery pack with a fire.

The main fire sensor 140 may be a sensor which is provided in the first channel 131 of the gas channel 130 and detects gas produced from battery cells 3 when a fire occurs, and for example, may be a carbon monoxide sensor that detects concentration of carbon monoxide (CO).

The main fire sensor 140 is connected to the controller 160 and inputs a signal which is generated when a fire is detected to the controller. Accordingly, the controller 160 can recognize that a fire has occurred in a battery pack 1 based on a signal from the main fire sensor 140.

For example, when the concentration of carbon monoxide in gas detected by the main fire sensor 140 is a set concentration or more, the controller 160 can determine that a fire has occurred in a battery pack 1.

Accordingly, as described above, the controller 160 can recognize a battery pack at which a fire has actually occurred of all of the battery packs mounted in a vehicle based on a signal from the assistant fire sensor 150, and can finally determine that a fire has occurred at the battery pack 1 mounted in the vehicle based on a signal from the main fire sensor 140.

The gas channel 130 is connected to the ventilation valve 120 and the gas channel 130 includes the first channel 131 connected to the inlet of the catalyst converter 154 from the connection port 124 of the ventilation valve 120, and the second channel 132 connected to a heat exchange channel 133 provided in the extinguishing agent tank 170 from the outlet of the catalyst converter 154.

That is, the gas channel 130 is connected to the heat exchange channel 133 provided in the extinguishing agent tank 170. The second channel 132 is connected to an end portion of the heat exchange channel 133 and a third channel 134 is connected to another end portion of the heat exchange channel 133.

The check valve 129 and the main fire sensor 140 are provided in the first channel 131. Accordingly, when a fire occurs, high-temperature flammable gas which is discharged from the battery pack 1 passes through the pressure balancing element 110 and the ventilation valve 120 and then sequentially passes through the check valve 129 and the main fire sensor 140 while flowing through the first channel 131.

Thereafter, the high-temperature flammable gas that has passed through the main fire sensor 140 passes through the catalyst converter 154 and the high-temperature gas that has passed through the catalyst converter 154 flows to the heat exchange channel 133 through the second channel 132.

The heat exchange channel 133 is a gas channel through which the high-temperature gas, which has passed through the first channel 131 and the second channel 132, flows, and is provided so that the extinguishing agent kept in a liquid state in the extinguishing agent tank 170 and the high-temperature gas passing through the heat exchange channel 133 can exchange heat with each other.

The high-temperature gas passing through the heat exchange channel 133 is gas that has sequentially passed through the first channel 131, the catalyst converter 154, and the second channel 132, that is, gas including high-temperature carbon dioxide converted from carbon monoxide of the gas while passing through the catalyst converter 154 after being produced and discharged from the battery pack 1 when a fire occurs. The gas that has passed through the heat exchange channel 133 flows to the third channel 134.

Carbon dioxide which is an extinguishing agent is kept in a liquid state in the extinguishing agent tank 170 at normal times and the extinguishing agent supply channel 171 is connected to the outlet of the extinguishing agent tank 170.

The extinguishing agent supply channel 171 is connected to the nozzle 172 provided at the battery pack 1 and the nozzle 172 is provided to be able to spray an extinguishing agent into the battery case 2. A second valve 182 which is controlled to open or close by the controller 160 is provided in the extinguishing agent supply channel 171.

As a result, when high-temperature gas passes through the heat exchange channel 133 provided in the extinguishing agent tank 170, heat exchange is made between the high-temperature gas and the liquid-state carbon dioxide, so that the pressure in the extinguishing agent tank 170 increases.

When the second valve 182 is opened in the instant state, the carbon dioxide at high pressure in the extinguishing agent tank 170 may be discharged to the extinguishing agent supply channel 171 and then sprayed into the battery pack 1 through the nozzle 172 by high vapor pressure even without a pressurizing unit such as a pump or a compressor.

The third channel 134 is connected to the inlet of the buffer tank 155 and an end portion of the fourth channel 135 is connected to an outlet of the buffer tank 155. Another end portion of the fourth channel 135 is connected to the gas channel, that is, the first channel 131 at the front end portion (upstream side) of the catalyst converter 154.

An assistant supply channel 137 is connected to the nozzle 172 provided at the battery pack 1 between the nozzle 172 and another outlet of the buffer tank 155. A connection channel 136 connecting the second channel 132 and the third channel 134 is separately provided between the channels.

A first valve 181 which is controlled to open or close by the controller 160 is provided in the second channel 132. The connection channel 136 diverges from the second channel 132 between the catalyst converter 154 and the first valve 182, and the first valve 181 is positioned between the heat exchange channel 133 and the point at which the connection channel 136 diverges from the second channel 132.

A third valve 183 which is controlled to open or close by the controller 160 is provided in the connection channel 136, a fourth valve 184 which is controlled to open or close by the controller 160 is provided in the assistant supply channel 137, and a fifth valve 185 which is controlled to open or close by the controller 160 is provided in the fourth channel 135.

Referring to FIG. 4, the main fire sensor 140 and the assistant fire sensor 150 are shown as detecting elements, the first valve 181, the second valve 182, the third valve 183, the fourth valve 184, and the fifth valve 185 are shown as operating elements, and the controller 160 that is configured to control opening and closing of the valves 181 to 185 is shown.

The valves 181 to 184 are electronic valves that are individually opened or closed in responses to control signals output from the controller 160, are provided to open or close corresponding channels, respectively, and a solenoid valve may be used as an example of the valves.

When determining that a fire has occurred at the battery pack through the assistant fire sensor 150 and the main fire sensor 140, the controller 160 is configured to control opening and closing of the valves so that gas produced from the battery pack 1 can pass sequentially through the catalyst converter 154 and the heat exchange channel 133 and so that the extinguishing agent in the extinguishing agent tank 170 may be supplied to the battery pack 1 with a fire.

The fire extinguishing system according to an exemplary embodiment of the present disclosure may further include a warning device 200 that operates to give a warning of a fire in response to a control signal output from the controller 160 when the controller 160 determines that a fire has occurred based on signals from the main fire sensor 140 and the assistant fire sensor 150.

The warning device 200 may be a sound output device which is provided to output an alarm that gives warning of a fire in a vehicle or a display in a vehicle that moves up or display a warning message that gives warning of a fire. The sound output device may include a speaker mounted in a vehicle and the display may be the display of a cluster.

The configuration of the fire extinguishing system according to an exemplary embodiment of the present disclosure was described above in detail. As described above, the catalyst converter 154 that converts carbon monoxide, which is contained in high-temperature flammable gas which is produced and discharged from a battery pack when a fire occurs, into carbon dioxide is used in the present disclosure.

In the fire extinguishing system according to an exemplary embodiment of the present disclosure, the catalyst converter 154 is connected to the first channel 131 of the gas channel 130. Accordingly, in the early stage of a battery fire, high-temperature flammable gas that was generated from a battery cell 3 of the battery pack 1 and has passed through the pressure balancing element 110 and the ventilation valve 120 is not discharged out of the vehicle and flows to the catalyst converter 154 through the first channel 131. As a result, carbon monoxide in the high-pressure flammable gas is converted into carbon dioxide while the flammable gas passes through the catalyst converter 154.

The catalyst converter 154 may be a catalyst converter in which a carrier including an oxidation catalyst of precious metal such as platinum, rhodium, palladium is accommodated in a case or may be a catalyst converter which is used in the exhaust gas purifier of common vehicles or has a similar configuration.

Gas which is produced when a fire occurs at a lithium ion battery includes a large amount of carbon monoxide (CO), some quantity of hydrogen fluoride (HF), a small amount of sulfur dioxide ($SO_2$), and a very small amount of hydrocarbon (HCl). of these components, the main component of flammable gas is carbon monoxide which is a flammable gas, and not only carbon monoxide, but sulfur dioxide is a flammable gas.

According to the catalyst converter that utilizes an oxidation catalyst, flammable gas may be completely converted into inflammable gas. For example, carbon monoxide may be converted into carbon dioxide which is inflammable gas by an oxidation reaction.

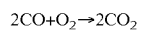

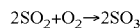

Figure 10:
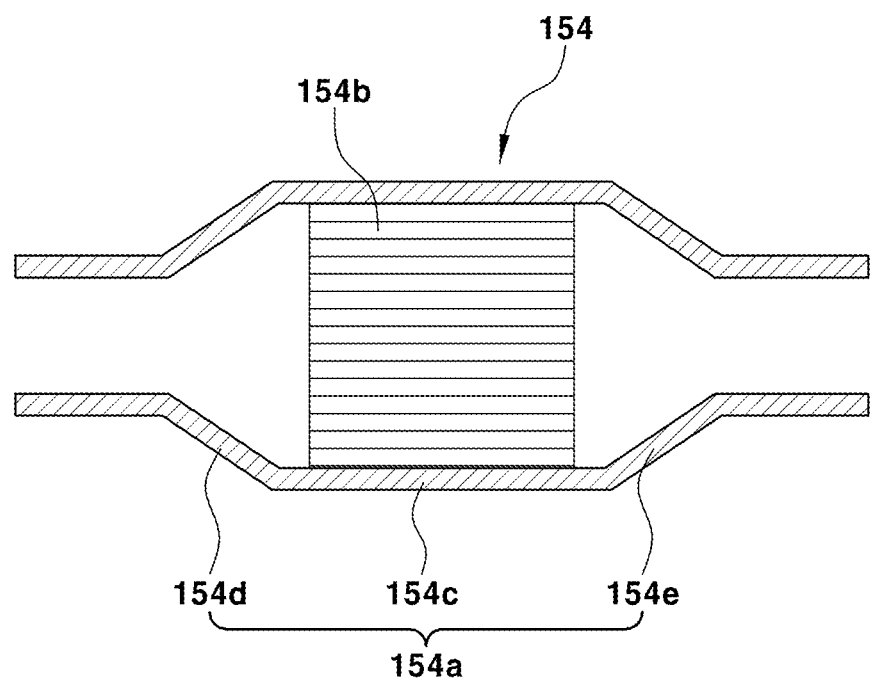
FIG. 10 is a view showing an example of the configuration of a catalyst converter which may be used in the fire extinguishing system according to an exemplary embodiment of the present disclosure.

FIG. 10 is a view showing an example of the configuration of a catalyst converter which may be used in the fire extinguishing system according to an exemplary embodiment of the present disclosure. As shown in the figure, the catalyst converter 154 has a configuration in which a carrier 154b including an oxidation catalyst of precious metal is accommodated in a case 154a.

The case 154a of the catalyst converter 154 has a body 154c including a shape of cylinder including a constant diameter, and an inlet 154d and an outlet 154e formed in cone shapes and integrally coupled to both end portions of the body 154c, respectively.

When a fire occurs and gas is discharged at an excessively high speed from the battery pack 1, catalyst oxidation reactivity in the catalyst converter 154 may be insufficient, so it is required to adjust the gas speed in the catalyst converter 154 by appropriately setting the cross-sectional sizes of the body 154c and the inlet 154d. It is possible to find out an optical cross-section combination by repeatedly testing the catalyst reactivity that depends on the channel cross-sectional areas of the passages of the body 154c and the inlet 154d.

Meanwhile, according to an exemplary embodiment of the present disclosure, the extinguishing agent in the extinguishing agent tank 170 may be naturally supplied to the battery pack 1 without a pump or a compressor by use of the heat of the gas that has passed through the catalyst converter 154, and to the present end, a heat exchanger that can transmit the heat of the high-temperature gas that has passed through the catalyst converter 154 to the extinguishing agent tank 170 is provided.

In the present disclosure, the heat exchanger enables heat exchange between the extinguishing agent kept in a liquid state in the extinguishing agent tank 170 and the high-temperature gas that has passed through the catalyst converter 154.

In an exemplary embodiment of the present disclosure, the heat exchanger may be configured by installing the heat exchange channel 133, through which gas can flow, in the extinguishing agent tank 170 and connecting the heat exchange channel 133 in the extinguishing agent tank 170 to the second channel 132 so that high-temperature gas that has passed through the catalyst converter 154 can flow through the heat exchange channel 133.

Accordingly, while the high-temperature gas that has passed through the catalyst converter 154 flows through the heat exchange channel 133, the heat of the high-temperature gas may be supplied to the inside of the extinguishing agent tank 170 by heat exchange in the heat exchange channel 133. When the heat of the high-temperature gas is transmitted to the carbon dioxide kept as an extinguishing agent in the extinguishing agent tank 170, high pressure is generated in the extinguishing agent tank 170.

Accordingly, carbon dioxide which is an extinguishing agent may be naturally discharged out of the extinguishing agent tank 170 by the high pressure in the extinguishing agent tank 170 even without a pump or a compressor, and the extinguishing agent discharged from the extinguishing agent tank 170 may be supplied to the nozzle 172 of the battery pack 1 with a fire through the extinguishing agent supply channel 171.

Carbon dioxide is in a gaseous state at room temperature, but is liquefied when pressure is applied, so carbon dioxide may be kept in a liquid state in the extinguishing agent tank 170 which is a high-pressure gas container. When the second valve 182 is opened to discharge carbon dioxide, carbon dioxide can flow in a liquid state (or gas state) through the extinguishing agent supply channel 171, but may be vaporized and sprayed from the nozzle 172.

Carbon dioxide has a large advantage that it is not contaminated after being used, and pressure of liquid-state carbon dioxide is very high, so liquid-state carbon dioxide may be discharged by the pressure thereof even without help of a pressurizing unit.

According to an exemplary embodiment of the present disclosure, when a primary battery fire occurs, the gas that has passed through the catalyst converter 154 flows to the heat exchange channel 133, increasing the temperature in the extinguishing agent tank 170. Accordingly, the vapor pressure in the extinguishing agent tank 170 is increased, so that the extinguishing agent in the extinguishing agent tank 170 may be supplied to the nozzle 172 of the battery pack 1.

The extinguishing agent supplied from the extinguishing agent tank 170 to the nozzle 172 through the extinguishing agent supply channel 171 is sprayed into the battery case 2 of the battery pack 1, primarily suppressing the fire a battery cell 3.

In the early stage of a battery fire, the gas (including carbon dioxide) that has passed through the catalyst converter 154, as described above, is used only to increase the temperature and pressure in the extinguishing agent tank 170 by flowing through the heat exchange channel 133 and is not used as an extinguishing agent for suppressing the battery fire.

Furthermore, in an early stage of a battery fire, in a primary battery fire before re-ignition, the gas that has passed through the heat exchange channel 133 in the extinguishing agent tank 170 undergoes a recirculation process in which the gas flows to the buffer tank 155 through the third channel 135 and then to the first channel 131.

The gas may flow backward into the battery pack 1 due to a rapid pressure change in the recirculation process of the gas, so there is a demand for an auxiliary storage space for suppressing a rapid pressure change.

Accordingly, the buffer tank 155 is provided and used at the auxiliary storage process in the present disclosure. In the early stage of a battery fire, in a primary battery fire before re-ignition, the gas that has passed through the heat exchange channel 133 flows to the buffer tank 155, whereby a rapid pressure change may be suppressed. The gas moving into the buffer tank 155 is recirculated by flowing to the first channel 131 and then passes through again the catalyst converter 154.

The most dangerous matter in a battery fire in a vehicle is that re-ignition frequently occurs. Accordingly, when re-ignition occurs after a fire is extinguished at the battery pack 1, that is, when the concentration of carbon monoxide detected by the main fire sensor 140 after primary fire suppression increases over a set concentration and it is determined that re-ignition has occurred, the gas generated in re-ignition is made pass through the catalyst converter 154 so that carbon monoxide in the gas is converted into carbon monoxide.

Because some of the extinguishing agent in the extinguishing agent tank 170 was used in the primary fire, carbon dioxide converted from carbon monoxide in flammable gas through the catalyst converter 154 may be supplied in to the battery pack 1 through the nozzle 172 as an extinguishing agent when re-ignition occurs (that is, a second fire occurs).

As a result, because flammable gas is not directly discharged out of a vehicle even though a fire occurs at a battery, it is possible to somewhat reduce the danger that a driver or passengers are poisoned by gas. Furthermore, when a battery fire occurs at an area with many people such as a school or a mart, it is possible to reduce a loss of lives including a driver or passengers which may be caused by flammable gas.

Hereafter, the general operation of the fire extinguishing system is described.

In FIG. 3, the arrows indicate an air flow path for pressure balancing of the battery pack. At normal times without a fire, the pressure balancing element 110 and the ventilation valve 120 of the fire extinguishing system are used to airflow and pressure balancing between the inside and the outside of the battery pack 1. At normal times, the first valve 181, the second valve 182, and the fourth valve 184 are controlled to be closed, and the third valve 183 and the fifth valve 185 are controlled to be open.

Gas can flow in and out of the battery pack 1 through the pressure balancing element 110 and the ventilation valve 120 with the atmosphere port 123 and the connection port 124 of the ventilation valve 120 both open, and pressure is balanced inside and outside the battery pack 1 while gas flows in the direction of the arrows.

Because the connection port 124 is a port which is always open, gas (air) can flow even through the connection port 124 and the gas channel 130 connected thereto at normal times. In the instant state, oxygen may be continuously supplied also to the catalyst converter 154 through the first channel 131 of the gas channel 130, and accordingly, oxygen to be used for an oxidation reaction may be stored in the oxidation catalyst in the catalyst converter 154.

Because the third valve 183 provided in the connection channel 136 and the fifth valve 184 provided in the fourth channel 135 are open with the first valve 181 provided in the second channel 132 closed, the air that has passed through the catalyst converter 154 may be circulated sequentially through the connection channel 136 of the second channel 132, the third channel 134, the buffer tank 155, and the fourth channel 135. As described above, at normal times, air cannot approach the extinguishing agent tank 170 and continuously circulates through the catalyst converter 154.

Figure 11:
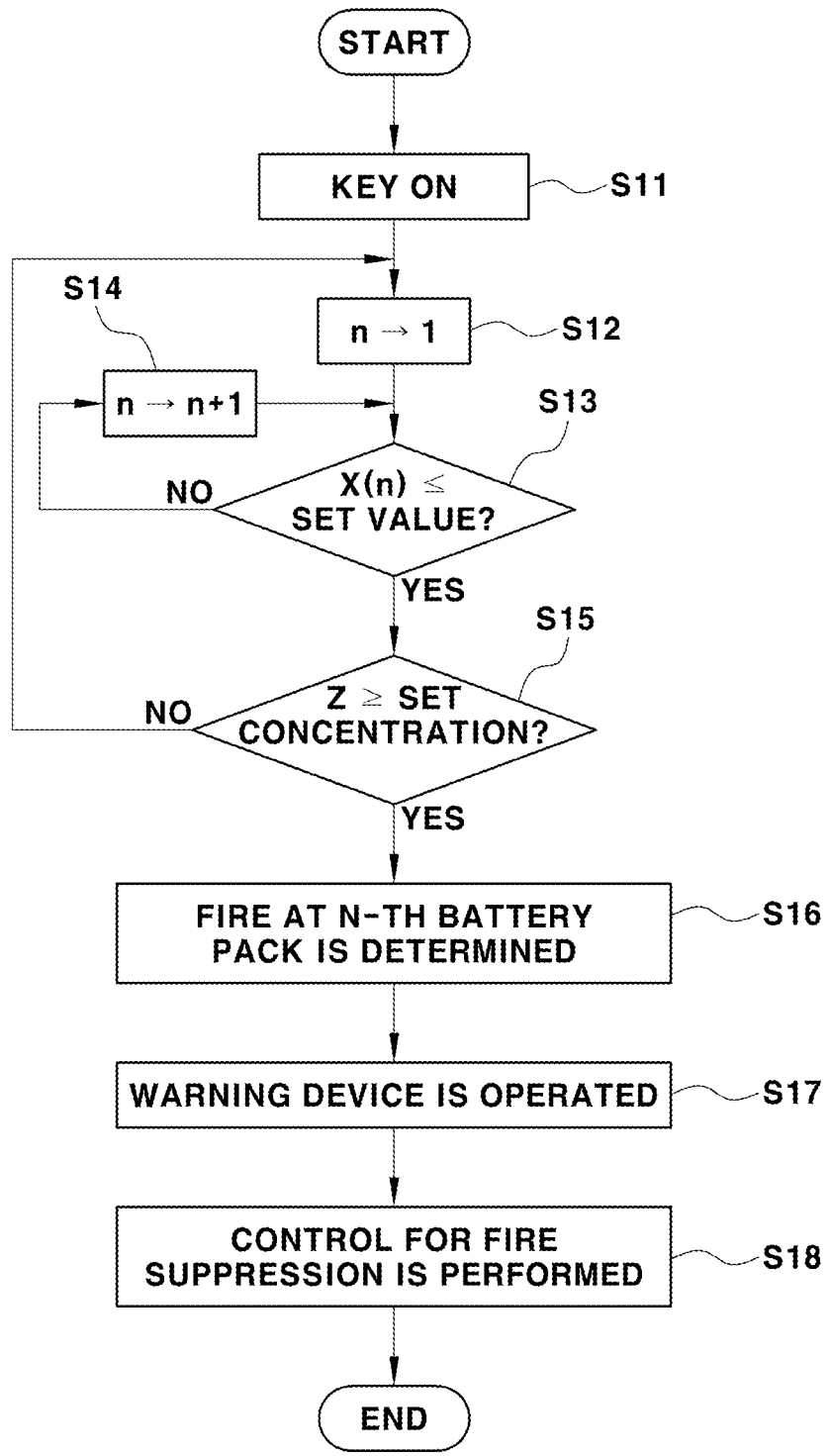
FIG. 11 is a flowchart showing the general operation process of the fire extinguishing system according to an exemplary embodiment of the present disclosure.

FIG. 11 is a flowchart showing the general operation process of the fire extinguishing system according to an exemplary embodiment of the present disclosure. It is exemplified that a plurality of (n) battery packs is mounted in a vehicle.

In a key-on state of a vehicle (S11), the controller 160 monitors in real time whether a fire occurs at the battery packs 1 based on signals from the assistant fire sensor 150 and the main fire sensor 140 (S12-S15). When a fire occurs at a battery pack 1, gas is discharged from the battery pack with a fire. The gas discharged from the battery pack flows through the gas channel 130 after sequentially passing through the pressure balancing element 110 and the ventilation valve 120.

In the present state, the controller 160 can recognize whether a fire has occurred at a battery pack 1 based on the main fire sensor 140 and can recognize the battery back 1 with a fire of all of the battery packs 1 based on a signal from the assistant fire sensor 150.

A process of recognizing a battery pack with a fire is described. The controller 160, performs real-time monitoring by reading out a signal value of the assistant fire sensor 150 provided for each battery pack 1, that is, the value of a current flowing through the wire 153 of each assistant fire sensor 150, and checks whether the current values X(n) of the wires 153 are a set value or less (S12-S14).

Gas that was discharged from a battery pack 1 with a fire and has passed through the pressure balancing element 110 flows into the ventilation valve 120. The gas flowing in the ventilation valve 120 pushes and moves the valve body 125 and the valve body 125 moves to the position for closing the atmosphere port 124 against the force of the spring 126 to prevent gas from being discharged to the atmosphere through the atmosphere port 124 (see FIG. 7).

After the valve body 125 moves to the position for closing the atmosphere port 123, the first magnet 151 and the second magnet 152 of the assistant fire sensor 150 are brought in contact with and attached to each other (see FIG. 7), and in the instant case, the controller 160 can read out the value of a current flowing through the wire 153.

The controller 160 determines that a fire has occurred at the corresponding battery pack 1 when the value of a current flowing through the wire 153 is the set value or less (or a variation of the value of a current is a predetermined amount or more). As a result, the controller 160 can recognize the battery pack 1 with a fire of all of the battery packs 1.

The gas that has sequentially passed through the pressure balancing element 110 and the ventilation valve 120 after being discharged from the battery pack 1 flows to the first channel 131 of the gas channel 130 and then passes through the main fire sensor 140 provided in the first channel 131.

The main fire sensor 140 can detect the concentration Z of a specific component, for example, carbon monoxide (CO) in the gas passing through the first channel 131 and outputs a signal based on the concentration of the specific component in the gas to the controller 160.

Accordingly, the controller 160 checks whether the concentration Z of the specific component in the gas is a set concentration or more based on the signal from the main fire sensor 140 (S15), and when the concentration is the set concentration or more, the controller 160 finally determines that a fire has occurred at the battery pack 1 (which is the n-th battery pack in FIG. 10) at which fire was detected by the assistant fire sensor 150 (S16).

Even though a current value which is a signal value of the assistant fire sensor 150 is the set value or less in step S13, as described above, it is finally determined that a fire has occurred at a corresponding battery pack 1 only when the concentration Z of carbon monoxide (CO) detected by the main fire sensor 140 is the set concentration of more in step S15, whereby a danger of misoperation is reduced.

Accordingly, when determining that a fire has occurred at the battery pack 1, the controller 160 warns a driver and passengers of a fire by operating the warning device 200 (S17), and performs control for suppressing the fire (S18).

Figure 12:
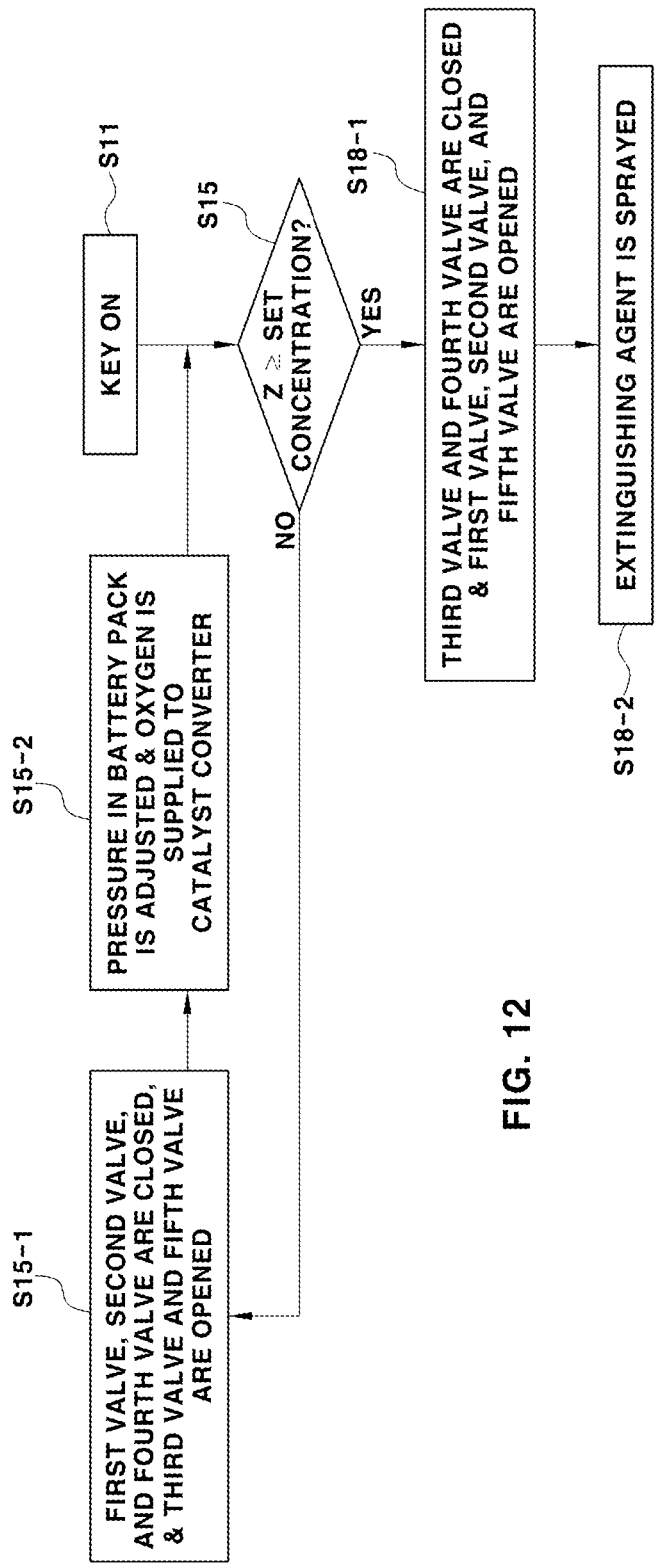
FIG. 12 is a flowchart illustrating an operation process in a primary battery fire of the fire extinguishing system according to an exemplary embodiment of the present disclosure.
Figure 13:
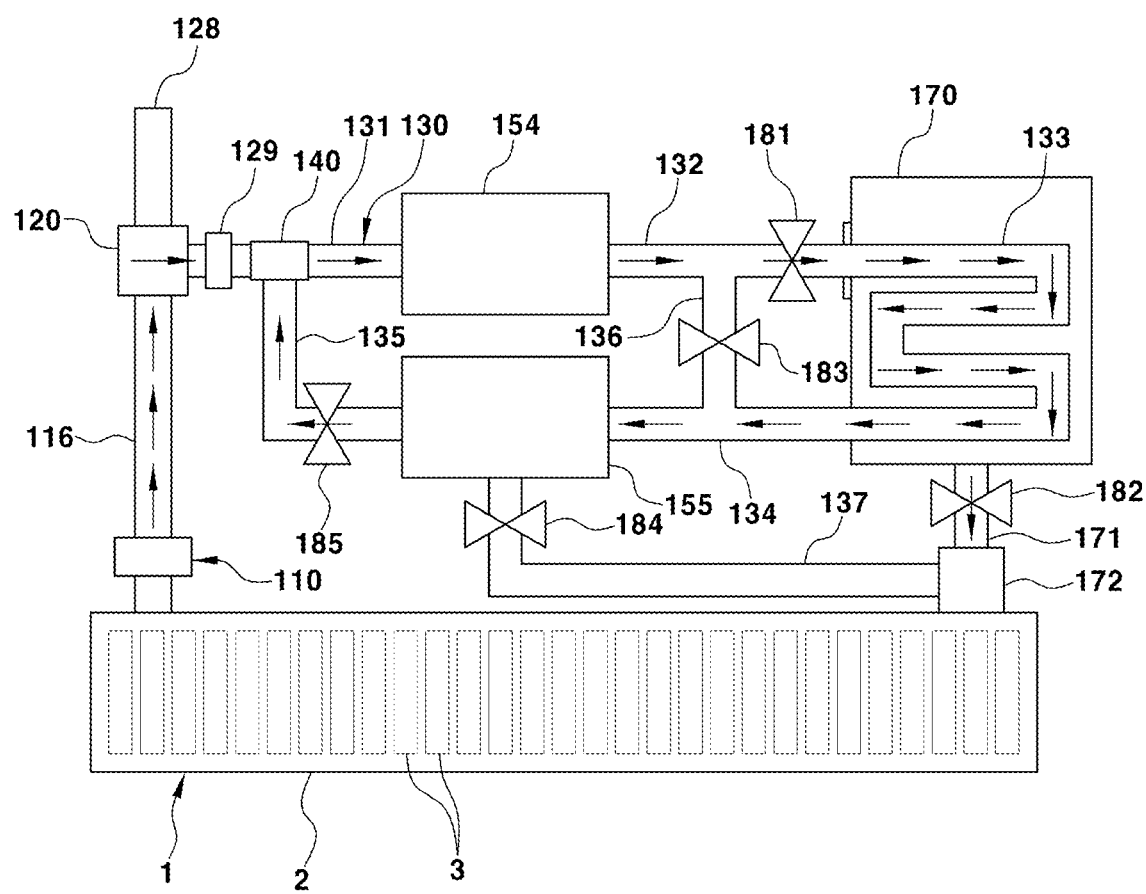
FIG. 13 is view showing a gas flow path in a primary battery fire in the fire extinguishing system according to an exemplary embodiment of the present disclosure.

FIG. 12 is a flowchart illustrating an operation process in a primary battery fire by the fire extinguishing system according to an exemplary embodiment of the present disclosure and FIG. 13 is view showing a gas flow path in a primary battery fire in the fire extinguishing system according to an exemplary embodiment of the present disclosure. Step S15 in FIG. 12 is a step that is the same as step S15 in FIG. 11, some of the steps shown in FIG. 11 are not shown in FIG. 12.

When a fire at a battery pack is not detected (Z<set concentration) in step S15, control at normal times described above is performed, that is, the first valve 181, the second valve 182, and the fourth valve 184 are controlled to close and is configured to control the third valve 183 and the fifth valve 185 are controlled to open by the controller 160 (S15-1). In the instant state, the internal pressure of the battery packs 1 are adjusted and oxygen may be supplied to the catalyst converter 154.

However, when it is finally determined that a fire has occurred at a battery pack 1 (Z≥set concentration) in step S15, the third valve 183 and the fourth valve 184 are controlled to open, and the first valve 181, the second valve 182, and the fifth valve 185 are controlled to open by the controller 160 (S18-1).

While high-temperature gas discharged from the battery pack 1 passes through the catalyst converter 154 in a fire, carbon monoxide in the gas is converted into carbon dioxide, and then the gas that has passed through the catalyst converter 154 passes through the heat exchange channel 133 in the extinguishing agent tank 170.

While the gas passes through the heat exchange channel 133, as described above, the pressure of the extinguishing agent tank 170 is increased by heat exchange between the gas and the liquid-state carbon dioxide in the extinguishing agent tank 170.

As a result, the carbon dioxide in the extinguishing agent tank 170 is discharged to the outside by the high vapor pressure in the extinguishing agent tank 170, and the carbon dioxide discharged outside is supplied to the nozzle 172 of the battery pack 1 with a fire through the extinguishing agent supply channel 171 (S18-2). Therefore, the carbon dioxide which is an extinguishing agent is finally sprayed into the battery pack 1 through the nozzle 172, whereby the fire at the battery pack is suppressed.

The gas that has passed through the catalyst converter 154 flows to the buffer tank 155 through the second channel 132, the heat exchange channel 133, and the third channel 134, and then undergoes a recirculation process in which the gas flows back to the first channel 131 and the catalyst converter 154 from the buffer tank 155.

An oxidation reaction is continuously generated in the catalyst converter 154 until a secondary fire (re-ignition) is detected, whereby carbon dioxide for suppressing a fire is produced and some of the produced carbon dioxide is kept in the buffer tank 155. The carbon dioxide kept in the buffer tank 155 may be used as an extinguishing agent when a secondary fire occurs.

Figure 14:
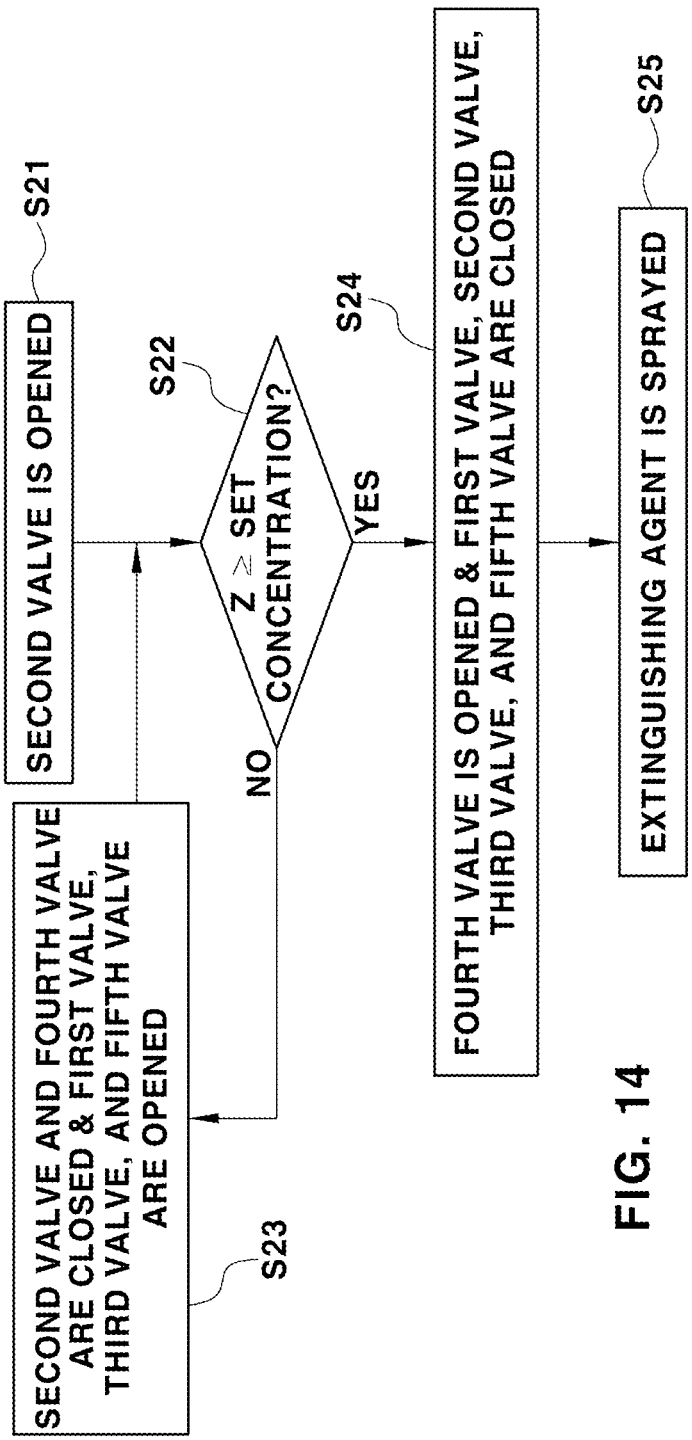
FIG. 14 is a flowchart illustrating an operation process in a secondary battery fire (re-ignition) of the fire extinguishing system according to an exemplary embodiment of the present disclosure.
Figure 15:
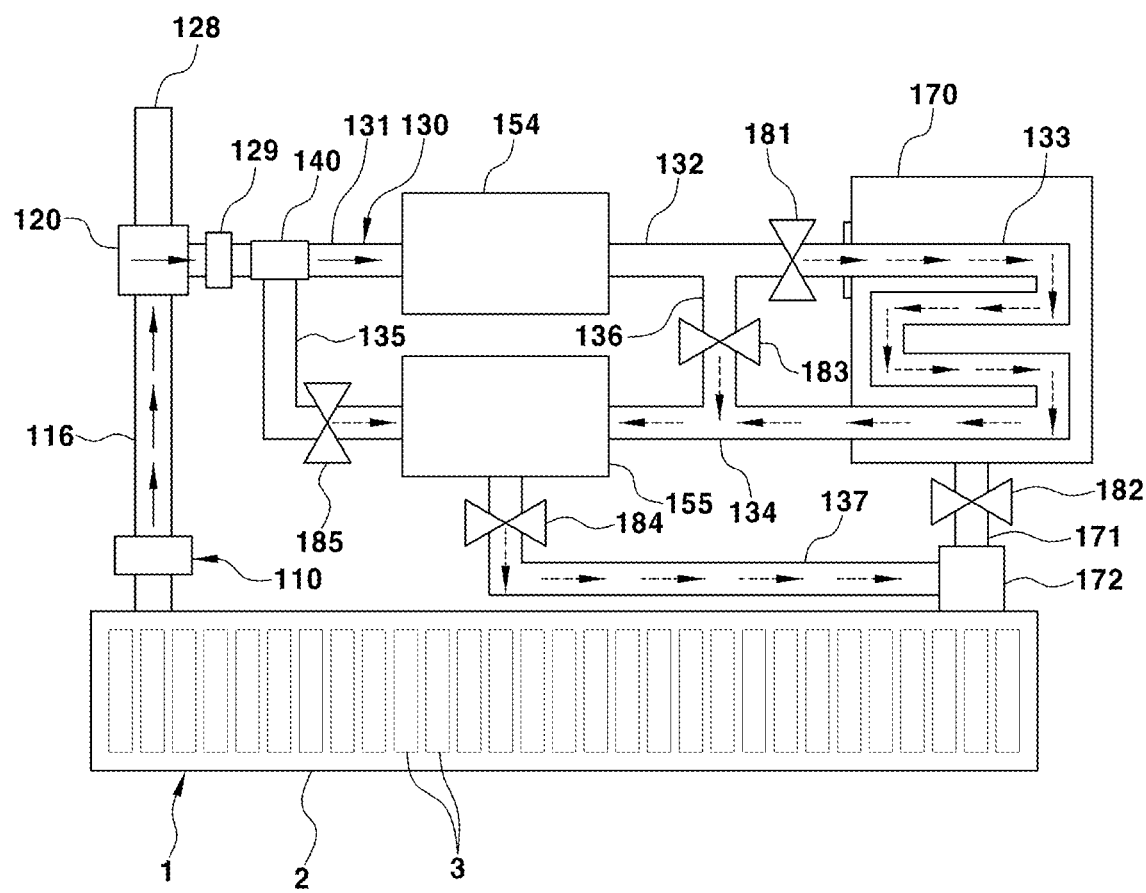
FIG. 15 is view showing a gas flow path in a secondary battery fire in the fire extinguishing system according to an exemplary embodiment of the present disclosure.

Next, FIG. 14 is a flowchart illustrating an operation process in a secondary battery fire (re-combustion) of the fire extinguishing system according to an exemplary embodiment of the present disclosure. FIG. 15 is view showing a gas flow path in a secondary battery fire in the fire extinguishing system according to an exemplary embodiment of the present disclosure.

The controller 160, as shown in the flowchart of FIG. 14, performs control for suppressing a secondary fire (re-ignition) after the second valve 182 is opened (on) (S21). The fact that the second valve 182 has opened once means that a first fire occurred.

When the second valve 182 is opened and a first fire is suppressed, the concentration of carbon monoxide (CO) detected by the main fire sensor 140 decreases to the set concentration, but when re-ignition occurs later, flammable gas is produced again from the battery pack 1.

In the assistant fire sensor 150 in the ventilation valve 120, when a primary fire is detected, the first magnet resistor 151 provided on the valve body 125 is attached to the second magnet resistor 152 provided on the internal surface of the valve housing 121, and then, the two magnet resistors 151 and 152 maintain the attached state by magnetism. Accordingly, in the ventilation valve 120, only the connection port 124 to which the first channel 131 is connected is maintained in the open state with the atmosphere port 123 closed.

If the concentration Z of carbon monoxide (CO) detected by the main fire sensor 140 becomes the set concentration or more (Z≥set concentration) in step S22 after the second valve 182 is opened (S21), the controller 160 determines re-ignition has occurred at the battery pack 1.

In the present state, only the fourth valve 184 provided in the assistant supply channel 137 is controlled to open, and the first valve 181, the second valve 182, the third valve 183, and the fifth valve 185 are controlled to close by the controller 160 (S24).

As a result, when the fourth valve 182 is opened, the high-pressure carbon dioxide collected and kept in the buffer tank 155 when the primary fire occurred is supplied to the nozzle 172 of the battery pack 1 with a fire through the assistant supply channel 137 and then sprayed into the battery pack 1 through the nozzle 172, whereby the secondary fire (re-ignition) is suppressed (S25).

When the carbon dioxide kept in the buffer tank 155 is supplied to the battery pack 1 for fire suppression, the carbon dioxide in the heat exchange channel 133 and at the rear end portion of the third valve 183 is also supplied to the nozzle 172 through the buffer tank 155.

Because the carbon dioxide which is supplied as an extinguishing agent in re-ignition, as described above, was converted from carbon monoxide in the flammable gas produced from the battery pack 1 by the catalyst converter 154, as described above, carbon dioxide converted by the catalyst converter 154 is used at an extinguishing agent in re-ignition.

If re-ignition does not occur after a primary fire, the second valve 182 and the fourth valve 184 are controlled to maintain the closed state and the first valve 181, the third valve 183, and the fifth valve 185 are controlled to maintain the open state by the controller 160 (S23).

To supply gas converted by the catalyst converter 154 by opening the fourth valve 184, the controller 160 may be set to open the fourth valve 184 for a set time and then closes the fourth valve 184. Thereafter, the controller 160 compares the concentration Z detected by the main fire sensor 140 with a set concentration, and may open again the fourth valve 184 for a set time only when the detected concentration is the set concentration or more.

It is possible to suppress re-ignition in the way of closing the fourth valve 184 after opening the fourth valve 184 and then checking the gas concentration. Furthermore, even if re-ignition is repeated later, fires may be suppressed in the same way (n-th fire suppression is performed).

The fire extinguishing system for a battery according to an exemplary embodiment of the present disclosure and a method of controlling the fire extinguishing system were described above. According to an exemplary embodiment of the present disclosure described above, it is possible to rapidly and accurately detect a fire that occurs at a battery in a vehicle and can effectively suppress the fire immediately after detecting.

According to an exemplary embodiment of the present disclosure, it is possible to supply an extinguishing agent in an extinguishing agent tank to a battery pack without a separate pressurizing unit such as a pump or a compressor by use of flammable gas, which is discharged from a battery pack when a fire occurs, as a thermal medium. Accordingly, it is possible to reduce the installation cost of the system and to suppress a fire even in a situation in which power cannot be supplied to drive a pump or a compressor.

Furthermore, it is possible to suppress a following fire using carbon dioxide, which was converted by the catalyst converter from carbon monoxide in flammable gas produced from a battery pack, as an extinguishing agent in re-ignition after a primary fire.

Furthermore, when one assistant fire sensor simply and inexpensively configured is provided for each battery pack and one main fire sensor (gas concentration measurement sensor) which is configured to measure a gas concentration is provided in the gas channel to which the battery packs are connected in the present disclosure, it is possible to detect a battery fire and recognize all battery packs with a fire using only the one expensive main fire sensor for the plurality of battery packs.

Because an inexpensive assistant fire sensor is used to recognize a battery pack with a fire and only one expensive main fire sensor is used to finally determine a battery pack with a fire, mis-detecting of a fire may be prevented and the manufacturing cost may be considerably reduced as compared with when an expensive gas concentration measurement sensor is provided for each battery pack, as in the related art.

Furthermore, because the fire extinguishing system of the present disclosure performs the function of a pressure balancing element, it is possible to balance the pressure inside and outside the battery pack without mounting several pressure balancing elements on the battery pack.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data non-transitory storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data non-transitory storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fire extinguishing system for a battery of a vehicle, the system comprising:
   a gas discharger provided at a battery pack and configured to discharge gas in the battery pack;
   a gas channel configured so that the gas produced from the battery pack and discharged through the gas discharger flows through the gas channel when a fire occurs;
   an extinguishing agent tank in which an extinguishing agent is kept;
   a heat exchange channel provided in the extinguishing agent tank, connected to the gas channel so that the gas supplied through the gas channel flows through the heat exchange channel, and facilitating heat exchange between the gas flowing through the heat exchange channel and the extinguishing agent kept in the extinguishing agent tank; and
   a nozzle provided at the battery pack, connected to the extinguishing agent tank through an extinguishing agent supply channel, and supplying the extinguishing agent, which is supplied from the extinguishing agent tank, into the battery pack,
   wherein the extinguishing agent kept in the extinguishing agent tank is supplied through the extinguishing agent supply channel by internal pressure of the extinguishing agent tank increased during the heat exchange.

2. The fire extinguishing system of claim 1, further including:
   a main fire sensor provided in the gas channel and configured to detect the fire that occurs at the battery pack;
   a controller configured to output a control signal for fire suppression when the fire at the battery pack is detected by the main fire sensor; and
   valves provided in the gas channel and the extinguishing agent supply channel and controlled to open or close in response to control signals output from the controller.

3. The fire extinguishing system of claim 2, further including a catalyst converter provided in the gas channel and configured to convert carbon monoxide in the gas, which is discharged from the battery pack and then flows through the gas channel when the fire occurs, into carbon dioxide.

4. The fire extinguishing system of claim 3,
   wherein a check valve configured to prevent the gas from flowing backward to the catalyst converter, and the main fire sensor are provided in the gas channel at an upstream side of the catalyst converter.

5. The fire extinguishing system of claim 3,
   wherein the gas channel includes a first channel which is a gas channel at an upstream side of the catalyst converter and a second channel which is a gas channel connecting the catalyst converter and an end portion of the heat exchange channel at a downstream side of the catalyst converter,
   wherein a third channel is connected to another end portion of the heat exchange channel, and
   wherein the third channel is connected to a buffer tank in which the gas, which has passed through the heat exchange channel, is collected and kept.

6. The fire extinguishing system of claim 5,
   wherein the valves include a first valve and a third valve,
   wherein a connection channel connecting the second channel and the third channel is disposed between the second channel and the third channel,
   wherein the first valve controlled to open or close in response to a control signal from the controller is provided at a position between the heat exchange channel and a point at which the connection channel diverges from the second channel, and
   wherein the third valve controlled to open or close in response to a control signal from the controller is provided in the connection channel.

7. The fire extinguishing system of claim 6,
   wherein the valves further include a fifth valve,
   wherein a fourth channel connecting the buffer tank and the first channel to each other is provided, and
   wherein the fifth valve controlled to open or close in response to a control signal from the controller is provided in the fourth channel.

8. The fire extinguishing system of claim 7,
   wherein the third valve and the fifth valve are maintained in a closed state at normal times in which the fire does not occurs, and
   wherein the third valve is controlled to close and the first valve and the fifth valve are controlled to open by the controller when the fire at the battery pack is detected by the main fire sensor.

9. The fire extinguishing system of claim 6,
   wherein the valves further include a fourth valve,
   wherein an assistant supply channel connecting the buffer tank and the nozzle is provided, and
   wherein a fourth valve controlled to open or close in response to a control signal from the controller is provided in the assistant supply channel.

10. The fire extinguishing system of claim 9, wherein the controller is configured to:
- control the third valve and the fourth valve to close and the first valve to open to suppress a primary fire when the primary fire at the battery pack is detected by the main fire sensor, and
- control the first valve and the third valve to close and the fourth valve to open when an additional fire due to re-ignition at the battery pack is detected by the main fire sensor after the primary fire is suppressed.

11. The fire extinguishing system of claim 10,
wherein the valves further include a fourth valve and a fifth valve,
wherein a fourth channel connecting the buffer tank and the first channel to each other is provided,
wherein the fifth valve controlled to open or close in response to a control signal from the controller is provided in the fourth channel, and
wherein the fifth valve is controlled to close by the controller when an additional fire due to re-ignition is detected.

12. The fire extinguishing system of claim 2,
wherein the valves include a second valve,
wherein the second valve controlled to open or close in response to a control signal from the controller is provided in the extinguishing agent supply channel, and
wherein the controller is configured to output a control signal for opening the second valve when the fire at the battery pack is detected by the main fire sensor.

13. The fire extinguishing system of claim 1, further including:
- a ventilation valve connected to the gas discharger and including a connection port being opened by the gas discharged through the gas discharger when the fire occurs,
wherein the gas channel is connected to the connection port of the ventilation valve so that the gas discharged through the gas discharger flows to the gas channel through the open connection port when the fire occurs.

14. The fire extinguishing system of claim 13,
wherein the gas discharger is a pressure balancing element that provides a passage for the gas to flow between the inside and the outside of a battery case, and
wherein the pressure balancing element includes:
- a vent portion protruding from the battery case and including a vent through which the gas flows inside and outside;
- a connector coupled to the vent portion and including an internal space that fluidically communicates with an internal space of the vent portion and an internal space of the battery case through the vent; and
- a venting channel coupled to the connector, including an internal channel that fluidically communicates with the internal space of the connector, and connected to the ventilation valve.

15. The fire extinguishing system of claim 14,
wherein a ventilation-waterproof film member configured to pass the gas but prevent moisture from flowing into the battery case is provided in the vent of the vent portion.

16. The fire extinguishing system of claim 13, wherein the ventilation valve
- has a ventilation port connected to the gas discharger, an atmosphere port being open to the atmosphere so that the gas flows between the atmosphere and the ventilation valve, and a connection port connected to the gas channel, and
- is configured so that the atmosphere port is closed by the gas produced in a battery case and discharged through the gas discharger when the fire occurs at the battery pack.

17. The fire extinguishing system of claim 16, wherein the ventilation valve includes:
- a valve housing including the ventilation port, the atmosphere port, and the connection port;
- a valve body provided in an internal space of the valve housing and being moved to close the atmosphere port by the gas flowing inside through the gas discharger; and
- a spring provided in the internal space of the valve housing to support the valve body, and
wherein the connection port of the valve housing is a port which is always open regardless of a position of the valve body.

18. The fire extinguishing system of claim 17, further including an assistant fire sensor provided in the ventilation valve and configured to detect the fire at the battery pack,
wherein the controller is configured to determine whether the fire has occurred at the battery pack and determine the battery pack with the fire based on signals from the main fire sensor and the assistant fire sensor.

19. The fire extinguishing system of claim 18, wherein the assistant fire sensor includes:
- a first magnet resistor provided on the valve body;
- a second magnet resistor fixed to the valve housing so that the first magnet resistor can be attached thereto when the valve body moves to a position for closing the atmosphere port; and
- a wire connecting the second magnet resistor and the controller so that electricity is transmitted therethrough.

20. The fire extinguishing system of claim 19, wherein the controller
- is provided to detect a current flowing through the wire while applying a current to the wire, and
- is configured to determine whether the fire has occurred at a corresponding battery pack when a value of the detected current is a predetermined value or less than the predetermined value or when a variation of the value of the detected current is a predetermined amount or more than the predetermined amount.

\* \* \* \* \*